United States Patent
Wakamatsu et al.

[15] 3,702,572
[45] Nov. 14, 1972

[54] AUTOMATIC TRANSMISSION CONTROL SYSTEM FOR AUTOMOBILE

[72] Inventors: Hisato Wakamatsu, Kariya; Akira Kitano, Nagoya; Hisasi Kawai, Toyohashi, all of Japan

[73] Assignee: Nippondenso Kabushiki Kaisha, Aichi-ken, Japan

[22] Filed: July 10, 1970

[21] Appl. No.: 53,909

Related U.S. Application Data

[63] Continuation-in-part of Ser. No. 34,098, May 4, 1970, and a continuation-in-part of Ser. No. 35,327, May 7, 1970, Pat. No. 3,662,625.

[30] Foreign Application Priority Data

July 14, 1969 Japan ...................44/55960
July 17, 1969 Japan ...................44/56566

[52] U.S. Cl.................................74/866, 74/752 D
[51] Int. Cl.........................B60k 21/00, F16h 5/42
[58] Field of Search..............................74/866

[56] References Cited

UNITED STATES PATENTS

| | | |
|---|---|---|
| 3,122,940 | 3/1964 | Shimwell et al. ............74/866 |
| 3,126,989 | 3/1964 | Baumann..................74/336 X |
| 3,439,564 | 4/1969 | Scholl et al..................74/866 |
| 3,448,640 | 6/1969 | Nelson........................74/866 |

Primary Examiner—Arthur T. McKeon
Attorney—Cushman, Darby and Cushman

[57] ABSTRACT

An automatic transmission control system for automobiles by detecting a vehicle speed and a load or throttle opening of a vehicle, is provided with a device for the ordinary driving on a flat road, a slope-ascending circuit for improved speed change operation in climbing up a slope and an ascent-run switching circuit for switching from a flat-road run to an ascent run.

3 Claims, 17 Drawing Figures

INVENTORS
Hisato Wakamatsu
et al

BY Cushman Darby & Cushman
ATTORNEYS

AUTOMATIC TRANSMISSION CONTROL SYSTEM FOR AUTOMOBILE

This application is a continuation-in-part of our commonly assigned application Ser. No. 34,098, filed May 4, 1970 and is copending with our commonly assigned application Ser. No. 35,327, filed May 7, 1970, now U.S. Pat. No. 3,662,625.

The present invention relates to an automatic transmission control device comprising an ascent-run switching circuit and a slope ascending circuit.

As an example of the conventional control device in an automatic transmission control means which consists of a fluid-type torque converter and a multi-stage gear transmission and is generally used as a transmission control device for automotive vehicles, an automatic four-speed change control device for a motor bus is explained below. In such a device, a gear specified from among the first-speed gear, second-speed gear, third-speed gear, fourth-speed gear and back (reverse) gear in the multistage gear transmission is coupled to the engine side gear through a fluid coupling called a fluid-type torque converter in a speed control device in accordance with the shifting points (lines) which are predetermined by the output of a d-c generator for detecting a vehicle speed and the output of a throttle switch representing the degree of the throttle opening. In order to prevent "hunting" which is caused at a shifting point when the gear position is downshifted from second to first speed, from third to second speed or from fourth to third speed after being upshifted in reverse order, a certain lag or hysteresis is provided between a point to shift to the next upper gear position and a point to shift from such next upper position to the next lower gear position. This method offers no problem as long as the vehicle is running along a flat road. But when a given speed cannot be maintained on an upward slope despite the throttle being fully opened, said hysteresis prevents a downshift even if such a downshift is wanted to maintain the vehicle's speed. As a result, the vehicle speed drops to a downshifting point. On the other hand, if the hysteresis is shortened, the gear position is downshifted too early and the best driving condition cannot be secured while running along a flat road. In the conventional control device, therefore, a driver must take the trouble to manually shift the gear position both on an ascent and a decline.

An object of the present invention is to provide an automatic transmission control device for automotive vehicles which comprises, in addition to a control means for a flat-road driving, an ascent-run switching circuit and a slope-ascending circuit whereby a gear change is achieved in a manner suitable to an ascent driving, making an automatic transmission possible not only on a flat road but on an upward slope either by the driver's operating of a switch or by automatically detecting an upward slope.

According to the present invention, besides the device for a flat-road or ordinary run, an ascent-run switching circuit and a slope ascending circuit which produces a signal of a full-opened throttle state regardless of the position of the accelerator pedal and facilitates a downshift to the next lower gear position to maintain or increase the vehicle speed are provided in a device for automatically changing the vehicle speed by discriminating the vehicle speed signal (voltage) from the signal (voltage) of a load or the throttle opening. Since either the gear shift characteristics for an ordinary run or those for an ascent run are selectively used according to the road condition, the device has such a fine effect that not only an automatic transmission is attainable both during an ordinary run and on an upward slope where the conventional means developed a defect, but also a speed adjustment with an engine brake is possible while running on a decline as there is no gear shift.

Another object of the present invention is to provide an automatic transmission control device for automotive vehicles with an ascent-run switching circuit and a slope-ascending circuit in addition to a control means for a flat-road run, so that actuation of the ascent-run switching circuit eliminates said hysteresis for a certain period of time and the slope-ascending circuit has gear shift characteristics suitable for ascending a slope, thereby enabling gears to be shifted automatically on an upward slope as well as on a flat road after the driver closes a switch or after the slope is automatically detected.

The present invention is newly provided with an ascent-run switching circuits as well as a slope-ascending circuit which, through the actuation of said ascent-run switching circuit, eliminates for a certain time interval a deviation or hysteresis provided between upshifting and downshifting points to prevent hunting. This absence of hysteresis for a certain time interval not only makes a downshifting operation much easier for increasing the vehicle speed but also makes it possible to switch between a gear shift characteristic for an ordinary run and one for an ascent-run according to the road condition. Hence the gears can be shifted automatically while running up a slope where the conventional device had difficulty, as well as during ordinary driving.

Other objects, features and advantages of the present invention will be made readily apparent from the following descriptions taken in conjunction with the accompanying drawings, in which.

Figure 11:
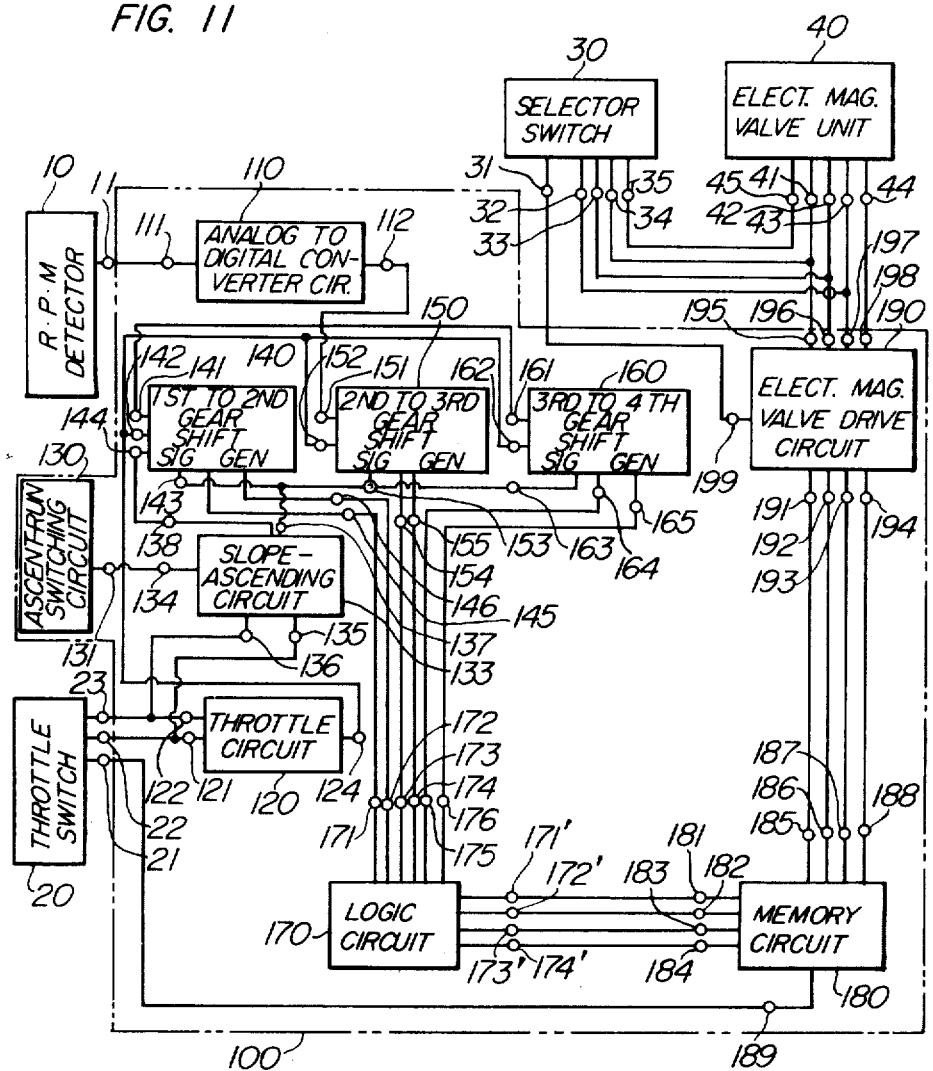
Figure 12:
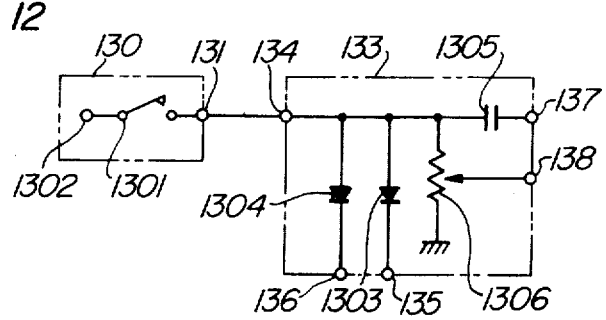
Figure 13:
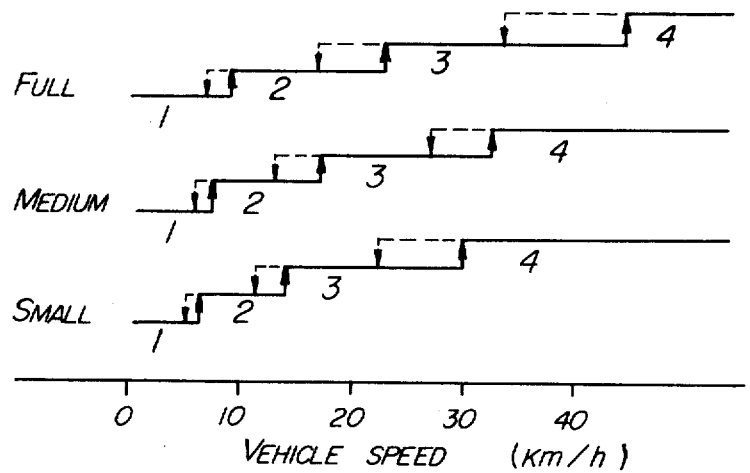
Figure 17:
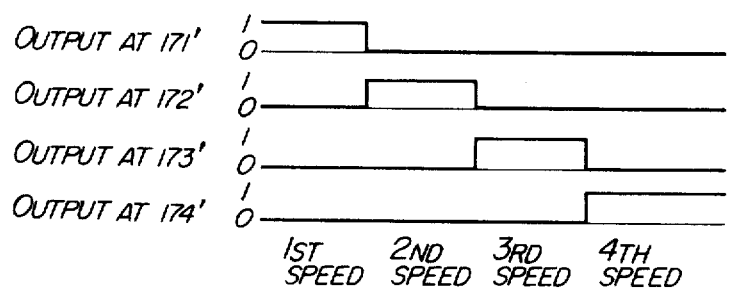
Figure 14:
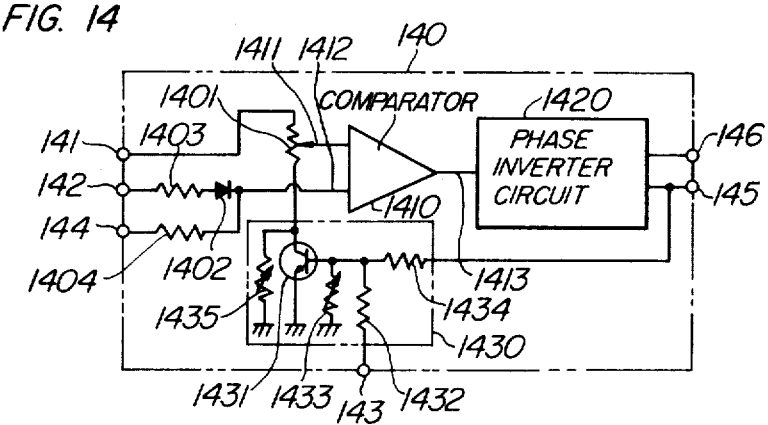
Figure 15:
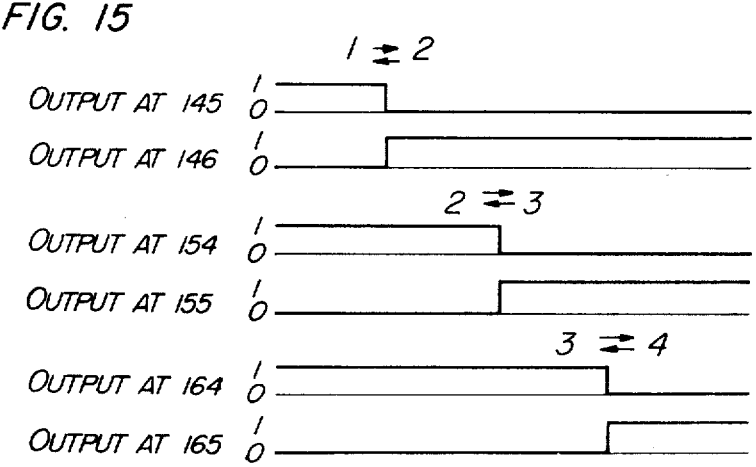
Figure 16:
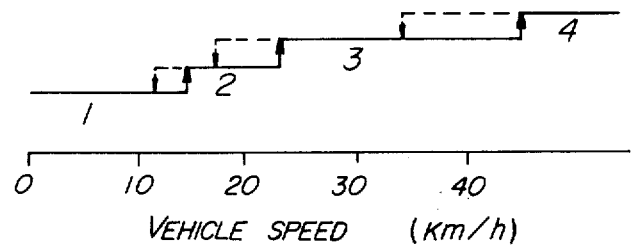

FIG. 11 indicates an electric block diagram of a second embodiment of the automatic transmission control system for automobiles according to the present invention;

FIG. 12 shows an electric wiring diagram for an ascent-run switching circuit and a slope-ascending circuit according to the second embodiment;

FIG. 13 shows a gear shift characteristics drawing for a flat-road run according to the second embodiment;

FIG. 14 is an electric wiring diagram illustrating a first to second speed change signal generator circuit according to the second embodiment;

FIG. 15 shows an output characteristics diagram illustrating the operation of three gear shift signal generator circuits according to the second embodiment;

FIG. 16 shows a gear shift characteristics diagram for an ascent-run according to the second embodiment; and FIG. 17 is an output characteristics diagram illustrating the operation of a logic circuit according to the second embodiment.

Below is explained the first embodiment of the present invention which is provided with a slope-ascending circuit which makes a signal of the full throttle opening irrespective of the accelerator pedal position.

Figure 1:
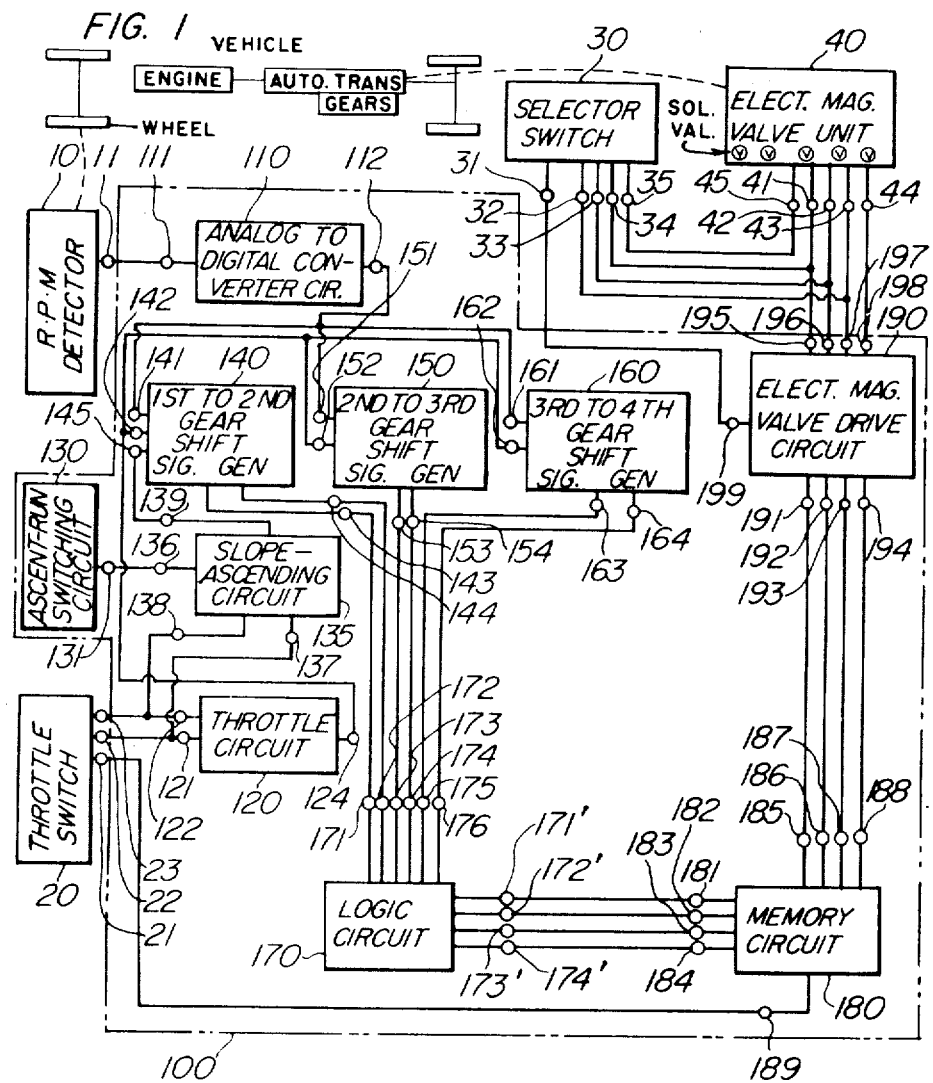
FIG. 1 is an electric block diagram showing a first embodiment of the automatic transmission control system for automobiles according to the present invention.

Referring to FIG. 1, the numeral 10 indicates an r.p.m. (revolutions per minute) detector for detecting the vehicle speed, 20 a throttle switch, 30 a selector switch and 40 an electromagnetic valve unit. Also, the reference numeral 100 shows a gear shift signal control circuit, 110 an analog converter circuit (such as shown in Wakamatsu et al., U.S. Pat. No. 3,507,544) circuit, 130 an ascent-run switching circuit, 135 a slope-ascending circuit, 140 a first-to-second gear shift signal generator circuit for producing a signal to change from first to second speed, 150 a second-to-third gear shift signal generator circuit for producing a signal to change from second to third speed, 160 a third-to-fourth gear shift signal generator circuit for producing a signal to change from third to fourth speed, 170 a logic circuit, 180 a memory circuit and 190 an electromagnetic valve drive circuit. The numeral 11 represents an output terminal of the r.p.m. detector and is connected to the input terminal 111 of the digital to analog converter 110. 21, 22 and 23 indicate the output terminals of the switch 20, the output terminal 21 being connected to the input terminal 189 of the memory circuit 180, the remaining output terminals 22 and 23 being connected respectively to the input terminals 121 and 122 of the throttle circuit 120. The output terminal 112 of the digital to analog converter circuit 110 is connected with the input terminals 141, 151 and 161 of the first-to-second, second-to-third and third-to-fourth gear shift signal generator circuits 140, 150 and 160 respectively. 123 indicates the output terminal of the throttle circuit 120 and is connected to the input terminals 142, 152 and 162 of the first-to-second, second-to-third and third-to-fourth gear shift signal generator circuits 140, 150 and 160 respectively. The output terminal 131 of the ascent-run switching circuit 130 is connected to the input terminal 136 of the slope-ascending circuit 135, whose output terminals 137 and 138 are in turn connected respectively to the input terminals 121 and 122 of the throttle circuit 120. The output terminal 139 of the slope-ascending circuit 135 is connected to the input terminal 145 of the first-to-second gear shift signal generator circuit 140, the output terminals of which are shown by the numerals 143 and 144 and respectively connected to the input terminals 171 and 172 of the logic circuit 170. The numerals 153 and 154 are the output terminals of the second-to-third gear shift signal generator circuit 150 and are connected to the input terminals 173 and 174 of the logic circuit 170 respectively, while 163 and 164 designate the output terminals of the third-to-fourth gear shift signal generator circuit 160 and are respectively connected to the input terminals 175 and 176 of the logic circuit 170, the output thereof shown by 171', 172', 173' and 174' being connected respectively with the input terminals 181, 182, 183 and 184 of the memory circuit 180. Also, the numerals 185, 186, 187 and 188 indicate the output terminals of the memory circuit 180 and are respectively connected to the input terminals 191, 192, 193 and 194 of the electromagnetic valve drive circuit 190, whose output terminals are in turn shown by 195, 196, 197 and 198 and are connected to the input terminals 41, 42, 43 and 44 respectively of the electromagnetic valve unit 40. 31, 32, 33, 34 and 35 indicate the output terminals of the selector switch 30, and the output terminal 31 is connected to the input terminal 199 of the electromagnetic valve drive circuit 190 while the remaining output terminals 32, 33, 34 and 35 are respectively connected to the input terminals 43, 42, 41 and 45 of the electromagnetic valve unit 40. The power source, power source circuit and power line are not shown.

Now explanation will be made about the main operation of each component of the above construction, referring in detail to its electric wiring diagram. The r.p.m. detector 10 is installed at an intake for an existing tachometer cable on an automotive vehicle or inside of a transmission and produces an output with a frequency proportional to the vehicle speed at the output terminal 11. The analog to digital converter circuit 110 is provided for converting the output frequency of the r.p.m. detector 10 into a proportionate voltage and produces an output thereof at the output terminal 112. The throttle switch 20, as shown in the electric wiring diagram in FIG. 2, consists of a multicontact switch including the movable contact 24 and the fixed contacts 21', 22' and 23', and is so constructed that the fixed contact 21' renders the throttle opening "small," the fixed contact 22' "medium" and the fixed contact 23' "full." The further the accelerator pedal 24' is depressed, the wider the throttle is opened, the movable contact 24 coming into contact with the fixed contacts 21', 22' and 23' in that order. Hence when the throttle opening is full, the movable contact 24 is in contact with all the fixed contacts 21', 22' and 23'. The movable contact 24 is impressed with a constant voltage E.

Figure 3:
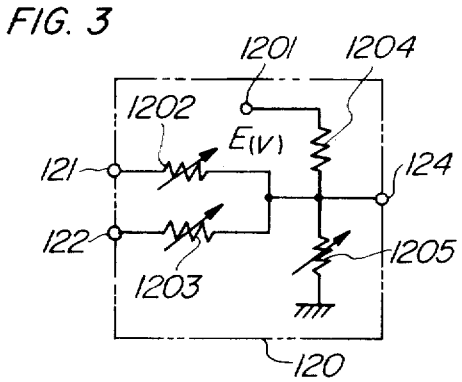
FIG. 3 shows an electric wiring diagram embodying the throttle circuit according to the present invention.

As is evident from the electric wiring diagram in FIG. 3 showing the throttle circuit 120, the voltage E is applied to the terminal 1201, whose input terminal 121 is connected with one end of the variable resistor 1202, the other end thereof being connected to the output terminal 124. One end of the variable resistor 1203 is connected to the input terminal 122 of the throttle circuit 120 while the other end is connected to the output terminal 124. The resistor 1204 is inserted between the terminal 1201 and the output terminal 124, to which one terminal of the variable resistor 1205 is connected, the other being grounded.

Let us explain the operation of the throttle circuit as constructed above. When the voltage E is not impressed on the input terminals 121 and 122, the voltage $E_1$ at the output terminal 124 is expressed as follows:

$$E_1 = \frac{R_1}{R+R_1} E \quad (1)$$

where $R$ shows the resistance of the resistor 1204 and $R_1$ the resistance of the variable resistor 1205.

In the next place, when the accelerator pedal is depressed to a point where the throttle switch 20 is energized to make the throttle opening "medium," i.e., when the signal $E$ is applied to the input terminal 121, the voltage $E_2$ at the output terminal 124

$$E_2 = \frac{R_1}{R_1 + R \| R_2} E \quad (2)$$

where $R_2$ denotes the resistance of the variable resistor 1202 and $R \| R_2$ equivalent resistance of the resistors $R$ and $R_2$ connected in parallel with each other.

In a similar fashion, when the accelerator pedal is depressed into the full state of the throttle switch 20, both the input terminals 121 and 122 are impressed with the voltage $E$. Here, let $R_3$ be the resistance of the variable resistor 1203, and then the voltage $E_3$ of the output terminal 124 is expressed as $$E_3 = \frac{R_1}{R_1 + R \| R_2 \| R_3} E \quad (3)$$

Figure 4:
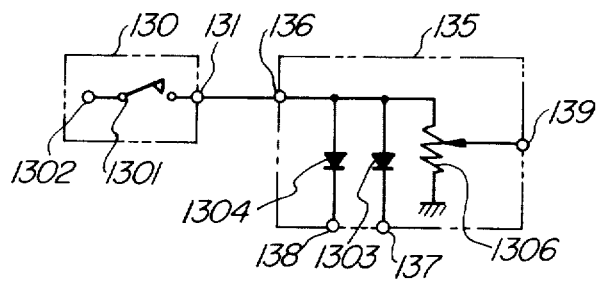
FIG. 4 is an electric wiring diagram showing an embodiment of an ascent-run switching circuit and a slope-ascending circuit according to the present invention.

So, it follows that according as the throttle switch is put into the states "small," "medium" and "full," the voltage at the output terminal 124 is changed from $E_1$ to $E_2$ to $E_3$ in that order. FIG. 4 illustrates the ascent-run switching circuit 130 and the slope-ascending circuit 135, where a switch 1301 has its fixed contact connected to the output terminal 131 and the movable contact is connected through the terminal 1302 to the power source circuit not shown in the figure. Both of the positive electrodes of the diodes 1303 and 1304 are connected to the input terminal 136 while their negative electrodes are connected to the output terminals 137 and 138 respectively. The numeral 1306 designates a variable resistor, one of whose terminals is connected to the input terminal 136, the other terminal being grounded. The movable terminal of the same variable resistor is connected to the output terminal 139.

Figure 5:
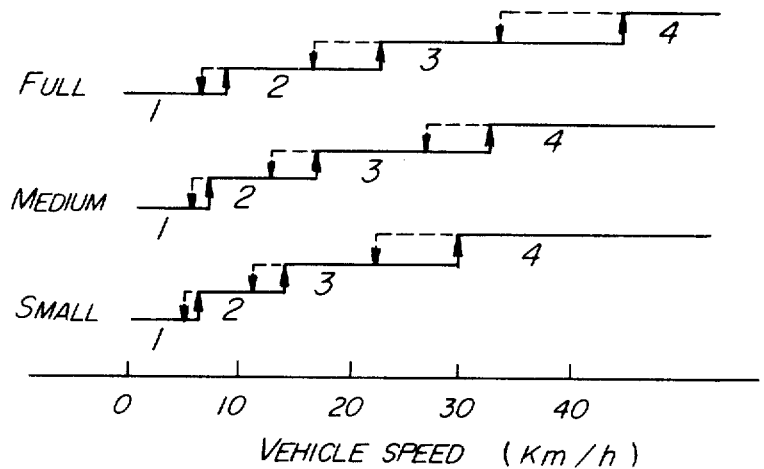
FIG. 5 shows gear shift characteristics for a flat-road run according to the present invention.
Figure 6:
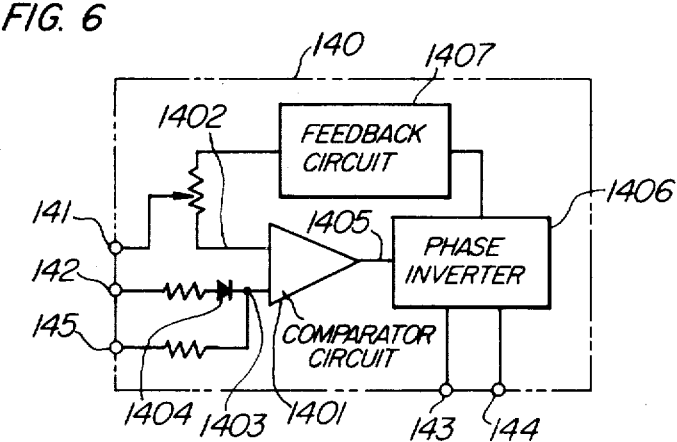
FIG. 6 illustrates an electric wiring diagram embodying a first to second speed change signal generator circuit according to the present invention.
Figure 7:
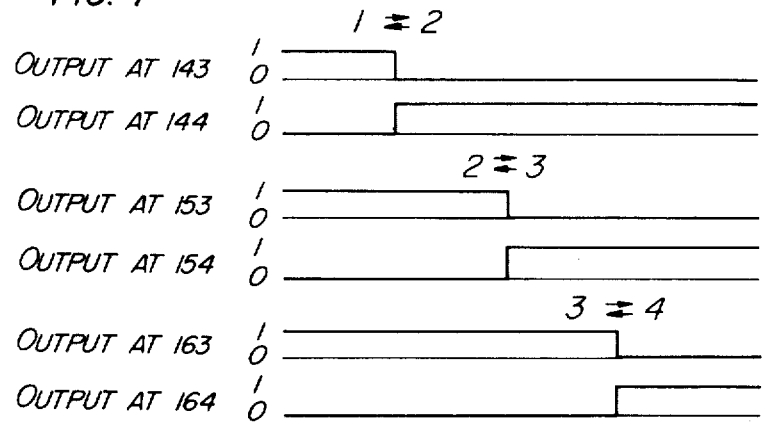
FIG. 7 is an output characteristics diagram illustrating the operation of three speed-change signal generator circuits.
Figure 8:
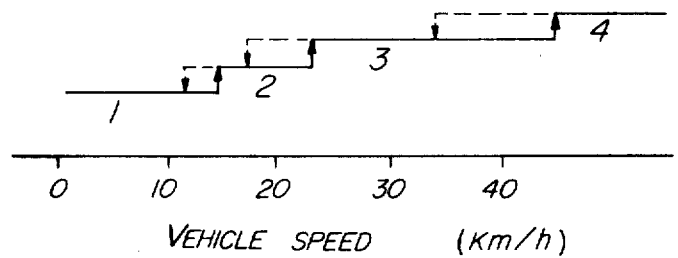
FIG. 8 shows gear shift characteristics for an ascent-run.

In explaining the operation according to this construction, the driver's closing of the switch 1301 for the ascent-run switching circuit 130 causes the output terminal 131 to produce the power voltage $E$, which in turn leads a like voltage $E$ to appear at the output terminals 137 and 138 through the input terminal 136 of the slope-ascending circuit 135 and diodes 1303 and 1304, resulting in the $E$ being applied to the input terminals 121 and 122 of the throttle circuit 120 in FIG. 3. Hence a signal of the full throttle opening is produced at the output terminal 124. On the other hand, at the output terminal 139 of the slope ascending circuit 135 is produced the signal $E_4$ or voltage divided by the variable resistor 1306. The first-to-second, the second-to-third and the third-to-fourth gear shift signal generator circuits, respectively symbolized by the numerals 140, 150 and 160, are so constructed that each of them compares a signal (voltage) proportional to the vehicle speed derived from the output terminal 112 of the digital to analog converter circuit 110 with a signal (voltage) from the throttle circuit 120 to indicate the throttle state, and develops a gear shift property as shown in FIG. 5 (except for the idle state) unless the switch 1301 of the ascent-run switching circuit 130 is closed. The abscissa in FIG. 5 shows the vehicle speed in Km/h and the ordinate the small, medium and full states of the throttle switch 20. The symbol 1 → 2 indicates a shifting point (line) from first to second speed, 2 → 1 from second to first speed, 2 → 3 from second to third speed, 3 → 4 from third to fourth speed and 4 → 3 from fourth to third speed. The shifting points (lines) 1 → 2 and 2 → 1 are so designed as to energize the first-to-second gear shift signal generator circuit 140. The same can be said of 2 → 3 and 3 → 2, and also 3 → 4 and 4 → 3 which are respectively so arranged as to actuate the second-to-third gear shift signal generator circuit 150 and the third-to-fourth gear shift signal generator circuit 160. The first-to-second gear shift signal generator circuit 140 is of such a construction as shown in FIG. 6 where 1401 represents a comparator circuit (for example as in U.S. Pat. No. 3,060,409), the input terminal 1402 of which is connected to a terminal of a variable resistor. The movable resistor of this variable resistor is connected with the input terminal 141 of the first-to-second gear shift signal generator circuit 140, the remaining terminal being connected to the output terminal of the feedback circuit 1407. The input terminal 1403 is connected to the negative electrode of the diode 1404 while the positive electrode thereof is connected through a resistor to the input terminal 142. The above output terminal 1403 is connected to the input terminal 145 of the first-to-second gear shift signal generator circuit 140 via a resistor. The aforesaid comparator circuit 1401 compares the voltages of the input terminals 1402 and 1403 and produces a signal indicating either the existence or the absence of voltage at the output terminal 1405 (existence and absence of voltage will hereinafter be shown by "1" and "0" respectively). 1406 indicates a phase inverter which also shapes (squares) a waveform, and its output terminals 143 and 144 produce the signals "1" and "0" respectively when a vehicle speed signal supplied to the input terminal 1402 of the comparator circuit 1401 turned out to be lower than a signal supplied to the input terminal 1403 thereof, and vice versa. The diode 1404 is inserted to eliminate the effect of the input terminal 145. The numeral 1407 shows a feedback circuit, which may be like the detailed feedback circuit 1430 in FIG. 14 but without its additional input via resistor 1432, and whose input and output sides are respectively connected to the phase inverter circuit 1406 (for example as in U.S. Pat. No. 3,274,333) and the input terminal 1402 of the comparator circuit, so that when the signals at the output terminals of the first-to-second gear shift signal generator circuit 140 change from "0" and "1" to "1" and "0" respectively, the voltage at the input terminal 1402 of the comparator circuit 1401 is rendered a little higher, thus creating a difference or hysteresis between upshifting and downshifting voltages to thereby prevent chattering, i.e., self-oscillation or hunting. Also, as the input terminal 145 of the first-to-second gear shift signal generator circuit 140 is connected to the output terminal 139 of the aforesaid slope-ascending circuit 135, the voltage at the input terminal 1403 of the comparator circuit 1401 in the first-to-second gear shift signal generator circuit 140 is made $E_4$ when the driver closes the switch 1301 of the ascent-run switching circuit 130. The second-to-third and the third-to-fourth gear shift signal generator circuits respectively numbered 150 and 160 are constructed in the same way as the first-to-second gear shift signal generator circuit 140 except that the former two lack the diode 1404, the input terminal 145 and the resistor connected thereto. So, it is also possible to set the shifting points $1 \to 2, 2 \to 3$ and $3 \to 4$ of said two circuits in the same manner as shown in FIG. 5 by adjusting the variable resistors connected to the input terminals of their respective comparator circuits. When shifting from the second to third speed, the output terminal 153 of the second-to-third gear shift signal generator circuit 150 generates the signal "0" while the other output terminal thereof produces "1." When the speed is shifted from third to second stage, by contrast, the output terminals 153 and 154 respectively produce the signals "1" and "0." Then, it naturally follows that the output terminals 143 and 144 of the first-to-second gear shift signal generator circuit 140 are "0" and "1" respectively. Similarly, when shifting from third to fourth speed, the output terminals 163 and 164 of the third-to-fourth gear shift signal generator circuit 160 are "0" and "1" respectively, and when shifting from fourth to third speed, the reverse is true. In this case, as a matter of course, the output terminals 143 and 153 of the first-to-second gear shift signal generator circuit 140 and the second-to-third gear shift signal generator circuit 150 respectively are in the state of "0" while the output terminals 144 and 155 are "1." The above is shown in FIG. 7, where $1 \rightleftarrows 2$ shows the gear shift from first to second and from second to first, $2 \rightleftarrows 3$ that from second to third and from third to second and $3 \rightleftarrows 4$ that from third to fourth and from fourth to third. The ordinate represents the state of the signal at each output terminal, "1" and "0" showing the wave up (output voltage generated) and the wave down (output voltage absent) respectively. As a result of closing the switch 1301 of the ascent-run switching circuit 130, not only a signal is produced to make the throttle opening into the full state regardless of the actual throttle state, but the throttle voltage at the input terminal 145 of the first-to-second gear shift signal generator circuit 140 is rendered $E_4$. Thus, a gear shift pattern is formed as shown in FIG. 8, where the abscissa shows the vehicle speed in Km/h and all of the shifting points are moved parallel towards the right when compared with those for an ordinary run shown in FIG. 5, making it possible to accelerate the vehicle at the next lower gear position. In addition, the shifting point (line) of $1 \rightleftarrows 2$ is set further to the right. Accordingly, on an especially steep slope, the vehicle speed can be increased at the first gear position, offering a convenience for an ascent run. While running down a slope, the disadvantage of the conventional device was that when desired to speed up slightly without changing the gear position from the second where the vehicle is running, a little push of the accelerator pedal tends to shift the gear to the third position as can be seen from the gear shift characteristics in FIG. 5, making it impossible to adjust the gear position with an engine brake. The present invention, on the other hand, has only a signal of the full throttle opening irrespective of the position of the accelerator pedal, and therefore there is no changing of a gear position to be made by a change in the throttle signal by way of the operation of the accelerator pedal. In addition, since the shifting points of the gear have been moved towards the points of larger vehicle speeds than the points of throttle signals in FIG. 5, the vehicle speed is adjustable with an engine brake. By the way, it is obvious that the same shifting pattern can be obtained for an ascent run if the voltage at the output terminal 124 of the throttle circuit 120 in FIG. 1 is elevated by a certain amount to move the pattern in FIG. 5 parallel toward the right.

It is also possible, unlike the present case where the driver operates a manual switch 130 to shift into an ascent-run, to perform an automatic switching operation by use of a combination of a level detector and accelerating and decelerating devices.

Figure 9:
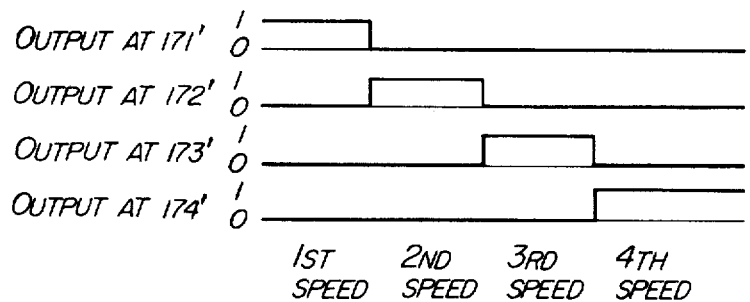
FIG. 9 is an output characteristics drawing illustrating the operation of a logic circuit according to the present invention.

The four output terminals 171', 172', 173' and 174' of the logic circuit 170 produce the output signals of the wave forms as shown in FIG. 9 when the signals in the wave forms shown in FIG. 7 are applied to the input terminals 171, 172, 173, 174, 175 and 176. In other words, the output terminal 171' is "1" and 172', 173' and 174' are "0" for the first speed. The output terminal 172' is "1" and 171', 173' and 174' are "0" for the second speed. The output terminal 173' is "1" and 171', 172' and 174' are "0" for the third speed. And the output terminal 174' is "1" and the remaining 171', 172' and 173' are "0" for the fourth speed.

The memory circuit 180 stores the information of what the present gear position is, i.e., how the transmission gears are presently engaged. When the accelerator pedal is released, the signal (voltage) at the output terminal 21 of the throttle switch 20 ceases to be produced (in an idle state). As a consequence, no signal is supplied to the input terminal 189 of the memory circuit 180, thereby cutting off the signal impressed on the input terminals 181, 182, 183 and 184 to continue to generate at the output terminals 185, 186, 187 and 188 a signal of the information stored immediately before the cut-off. Except when the throttle switch 20 is in the idle state, it indicates the first speed if the input terminal 181 is "1" and 182, 183 and 184 "0." At this time, the output terminal 185 and 187 are "0" while 186 and 188 are "1." When the input terminal 182 is "1" and 181, 183 and 184 are "0," it means the second speed signal, in which case the output terminals 186 and 187 are "0" and 185 and 188 are "1." If the input terminal 183 is at "1" and the remaining 181, 182 and 184 are "0," the third speed is indicated in which case the output terminals 186 and 188 are "0" while 185 and 187 are "1". Lastly, when the input terminal 184 is "1" and the other 181, 182 and 183 are "0," the fourth speed is signaled and the output terminals 185 and 188 stay in "0" while 186 and 187 in "1."The above is tabulated as follows:

Signal states of memory circuit 180 input and output terminals

| gear shift signals | input terminals 181, 182, 183 & 184 | output terminals 185 186 187 188 | | | |
|---|---|---|---|---|---|
| first speed | 181 is "1", the others "0" | 0 | 1 | 0 | 1 |
| second speed | 182 is "1", the others "0" | 1 | 0 | 0 | 1 |
| third speed | 183 is "1", the others "0" | 1 | 0 | 1 | 0 |
| fourth speed | 184 is "1", the others "0" | 0 | 1 | 1 | 0 |

Figure 10:
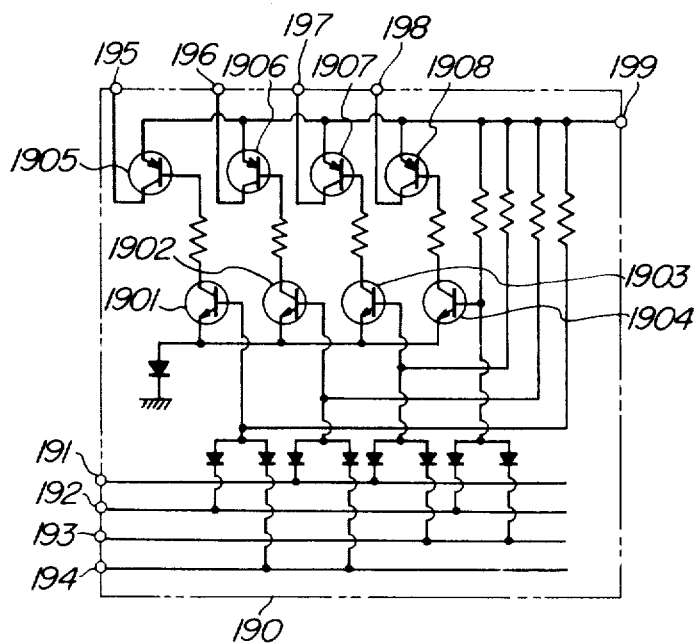
FIG. 10 is an electric wiring diagram representing an embodiment of an electromagnetic valve drive circuit according to the present invention.

The electric wiring diagram of the electromagnetic valve drive circuit 190 is shown in FIG. 10, where the input terminal 199 is connected to the power circuit (not shown) through the terminal 31 and the contact (not shown) of the selector switch 30. When the input terminals 192 and 194 are in "1" and 191 and 193 are in "0, " only the transistor 1901 conducts and the others are cut off. When the input terminals 191 and 194 are "1" while the terminals 192 and 193 are "0," there is conduction only in the transistor 1902 and the others are cut off. If the input terminals 191 and 193 are "1" while the input terminals 192 and 194 are "0," conduction begins only in the transistor 1903 and the others are cut off. When the input terminals 192 and 193 are "1" whereas the terminals 191 and 194 are "0,"only the transistor 1904 conducts and the others are cut off. In addition to a logic circuit which operates as above, the electromagnetic valve drive circuit includes a power supply circuit which feeds the output terminals 195, 196, 197 and 198 respectively by the energization of the transistors 1905, 1906, 1907 and 1908 which in turn are triggered by the corresponding transistors 1901, 1902, 1903 and 1904. The power from the output terminals 195, 196, 197 and 198 respectively triggers the first, second, third and fourth speed coils of the electromagnetic valve unit 40. When one of the coils, say, the second speed coil, is energized, the electromagnetic valve for the second speed in the electromagnetic valve unit is opened and compressed air from a conventional air compressor not shown passes through the electromagnetic valve to actuate the clutch for the second speed. Then, the second speed gear is engaged with the engine side gear via a fluid coupling, thus completing a speed change. The same can be said of the first, third and fourth speed coils as well as the reverse coil. The selector switch 30 consists of five fixed contacts and a movable contact with a lever. When the lever is positioned into "Automatic," power is supplied to the output terminal 31, thereby energizing the electromagnetic valve drive circuit 190. This is an operation for an automatic speed change. Also, if a speed is to be changed manually without using the automatic transmission control system, the manual lever is operated as follows: When the lever is placed at position 1, power is supplied to the output terminal 34 to energize the first speed coil of the electromagnetic valve unit 40; When the lever is positioned into 2, power is supplied to the output terminal 33 to energize the second speed coil thereof; When the lever is positioned into 3, power is supplied to the output terminal 32 to energize the third speed coil thereof; and when the lever is put into position R, the output terminal 35 is fed with power to trigger the reverse coil. Accordingly, the gear is shifted into the positions required for the above-mentioned respective operations.

In the next place, explanation is made about a second embodiment which is provided with a slope ascending circuit to obviate for a certain period of time hysteresis at the shifting points. By way of simplification, the explanation is limited to the construction and operation of those components which are not included in the first embodiment. This embodiment is intended to eliminate the aforementioned hysteresis for a certain time interval at the time of energization of the ascent-run switching circuit in the first embodiment.

In FIG. 11, the slope-ascending circuit is shown by the numeral 133, whose input terminal 134 is connected with the output terminal 131 of the ascent-run switching circuit 130, while the output terminals 135 and 136 of the slope ascending circuit 133 are respectively connected to the input terminals 121 and 122 of the throttle circuit. The output terminal 137 is connected to all of the input terminals 143, 153 and 163 of the first-to-second gear shift signal generator circuit 140, the second-to-third gear shift signal shift signal generator circuit 150 and the third-to-fourth gear shift signal generator circuit 160 respectively. Also, the output terminal 138 is connected to the input terminal 144 of the first-to-second gear shift signal generator circuit 140, whose output terminals are shown by the numerals 145 and 146 and are connected respectively to the input terminals 171 and 172 of the logic circuit 170.

Figure 2:
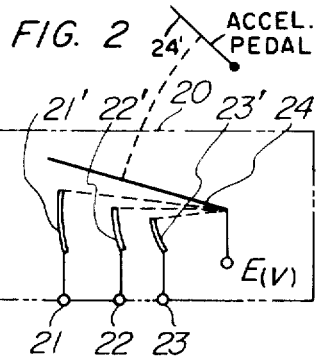
FIG. 2 is an electric wiring diagram showing an embodiment of a throttle switch according to the present invention.

The electric wiring diagrams of the throttle switch 20 and the throttle circuit 120 are the same as shown in FIGS. 2 and 3 respectively. Their operations are also the same and are described above.

FIG. 12 shows the ascent-run switching circuit 130 and the slope ascending circuit 133, in which the numeral 1301 identifies a switch whose fixed contact is connected to the output terminal 131, the movable contact thereof being connected to the power circuit (not shown) via the terminal 1302. The positive electrodes of the diodes 1303 and 1304 are both connected to the input terminal 134 and their negative electrodes to the output terminals 135 and 136 respectively. Further, the numeral 1305 designates a capacitor, a terminal of which is wired to the input terminal 134 while the other terminal is connected to the output terminal 137. The numeral 1306 shows a variable resistor. A fixed terminal thereof is connected to the input terminal 134 and the other fixed terminal grounded. Also, the movable terminal of said resistor is connected to the output terminal 138 of the slope-ascending circuit 133.

By way of explaining about the operation in the above construction, the driver's closing of switch 1301 of the ascent-run switching circuit 130 produces a source voltage E at the output terminal 131. This in turn causes a signal almost equal to E to appear at the output terminals 135 and 136 of said slope ascending circuit 133 by way of the input terminal 134 thereof and the diodes 1303 and 1304. Consequently, the voltage E is impressed on the input terminals 121 and 122 of the throttle circuit 120 (the same as in FIG. 3) with the result that a signal of the full throttle opening is produced at the output terminal 124. On the other hand, a charge current from the capacitor 1305 of the slope ascending circuit 133 flows at the output terminal 137 for a period of time equivalent to a time constant determined by a load resistance and the capacitor 1305 connected therewith. In addition, at the output terminal 138 appears a signal $E_4$ or voltage divided from the voltage E by the variable resistor 1306. In the next place, when the switch 1301 of the ascent-run switching circuit 130 is opened, the output terminals 135, 136 and 138 of the slope ascending circuit 133 produce no signal (voltage), so that the capacitor 1305 discharges through the variable resistor 1306 and the load resistance of the output terminal 137, thereby stopping generation of the signal at the terminal 137.

Each of the first-to-second, second-to-third and third-to-fourth gear shift signal generator circuits respectively symbolized by 140, 150 and 160 compares a signal (voltage) delivered from the output terminal 112 of the digital to analog converter 110 proportional to the vehicle speed with a signal (voltage) indicating the throttle state and supplied from the throttle circuit 120, and is so arranged as to develop the gear shift characteristics as shown in FIG. 13 (except for the idle state) unless the switch 1301 of the ascent-run switching circuit 130 is closed. In FIG. 3, the abscissa represents a vehicle speed in Km/h and the ordinate the small, medium and full throttle opening states of the throttle switch 20 together with their respective shifting points (lines).

FIG. 14 shows a circuit construction of the first-to-second gear shift signal generator circuit 140. The numeral 1410 identifies a comparator circuit whose input terminal 1411 is connected to a movable terminal of the variable resistor 1401, one of whose fixed terminals is connected to the input terminal 141 of the first-to-second gear shift signal generator circuit 140, the other terminal thereof being linked to the collector of the NPN transistor of the feedback circuit 1430. Moreover, the other input terminal 1412 of the comparator circuit 1410 is connected to the negative electrode of the diode 1402 while the positive electrode thereof is connected to the input terminal 142 of the first-to-second gear shift signal generator circuit 140 via the resistor 1403. Besides, the input terminal 1412 of the comparator circuit 1410 is connected to the input terminal 144 of the first-to-second gear shift signal generator circuit through the resistor 1404, while the output terminal of the comparator circuit 1410 is connected to the phase inverter circuit 1420 which doubles as a shaping (squaring) circuit. The two outputs of said phase inverter circuit 1420 are respectively delivered to the output terminals 145 and 146 of the first-to-second gear shift generator circuit 140, the output terminal 145 being connected to the base of the transistor 1431 through the resistor 1434 in the feedback circuit 1430. The emitter of the transistor 1431 in the feedback circuit 1430 is connected to the earth while the base thereof is connected to the input terminal 143 of the first-to-second gear shift signal generator circuit 140 through the resistor 1432. One of the terminals of the variable resistor 1433 is connected to the base of the transistor 1431 and the other grounded, while one of the terminals of the variable resistor 1435 is connected to the collector of the transistor 1431 and the other is grounded.

The second-to-third and third-to-fourth gear shift signal generator circuits, respectively represented by the numerals 150 and 160 are of the same construction as the first-to-second gear shift signal generator circuit except that the former two circuits lack the diode 1402, resistor 1404, input terminal 144, resistor 1432 and its input terminal 143.

By way of explanation, the first-to-second gear shift signal generator circuit 140 operates as follows: It is so constructed that when the voltage at the input terminal 1411 is lower than the voltage at the input terminal 1412, the comparator circuit 1410 produces no output voltage, resulting in no output voltage of the phase inversion circuit, namely, no voltage at the output terminal 145 of the first-to-second gear shift signal generator circuit 140, but a voltage is produced at the output terminal 146. Symbolizing the absence of voltage as "0" and the existence thereof as "1," the transistor of the feedback circuit 1430 is conducting when the output terminal 145 is "1." Also, when a signal (voltage) $E_n$ supplied from the input terminal 141 is divided by the variable resistor 1401, the voltage $E_{n1}$ at the input terminal 1411 of the comparator circuit 1410 is expressed as follows:

$$E_{n1} = \frac{r_2}{r_1 + r_2} E_n$$

where $r_1$ is such a portion of the resistance of the variable resistor 1401 on the side of the input terminal 141 and $r_2$ the remaining portion thereof on the side of the collector of the transistor 1431, as divided at the contact point of the movable terminal of said resistor, and the saturation voltage of the transistor 1431 is neglected. With the increase in the vehicle speed or the resulting rise in $E_n$, $E_{n1}$ is heightened proportionally. And, the instant $E_{n1}$ has surpassed the voltage $E_t$ (output voltage $E_1$ or $E_2$ or $E_3$ of said throttle circuit 120) at the input terminal 1412 of the comparator circuit 1410, the output of the comparator circuit 1410 is rendered "1" while the output terminals 145 and 146 of the phase inverter circuit become "0" and "1" respectively. This makes the transistor of the feedback circuit 1430 unconducting. The preceding description concerns a change from first to second speed.

As a result of the transistor 1431 being cut off, even though the voltage at the input terminal 141 of the first-to-second gear shift signal generator circuit 140 does not increase, the voltage $E_{n1}'$ at the input terminal 1411 of the comparator circuit 1410 becomes:

$$\Delta E_{n1}' = \frac{r_2 + r}{r_1 + r_2 + r} E_n$$

where $r$ is the resistance of the variable resistor 1435. This voltage value is higher than the corresponding voltage during the conduction of the transistor 1431, by:

$$\Delta E_{n1} = E_{n1}' - E_{n1} = \frac{r r_1}{(r_1 + r_2)(r_1 + r_2 + r)} E_n$$

Conversely, if the vehicle speed goes down thereafter, it downshifts from second to first not at the instant $E_{n1}$ has become lower than $E_g$ but at the moment that $\Delta E_{n1} + E_{n1}$ has been exceeded by $E_o$, which means that the gear is actually downshifted from second to first position only after a further drop in vehicle speed equivalent to $\Delta E_{n1}$, which is a hysteresis to prevent a hunting. The shifting point from first to second speed can be adjusted with the variable resistor 1401 while the amount of hysteresis caused at the time of downshifting from second to first speed can be regulated with the variable resistor 1435.

In like manner, the second-to-third gear shift signal generator circuit 150 can determine an amount of hysteresis between the shifting point from second to third speed and a point of the gear shifting from third to second speed. In this case, the output terminals 154 and 155 are "1" and "0" respectively at the second speed, and said terminals 154 and 155 are "0" and "1" respectively at the third speed. Also, this is true of the third-to-fourth gear shift signal generator circuit 160, by means of which it is possible to set an amount of hysteresis between the shifting point from third to fourth speed and the point of downshifting from fourth to third speed. When in the third speed position, the output terminals 164 and 165 are respectively "1" and "0,"whereas in the state of fourth speed, the output terminals 164 and 165 are respectively "0" and "1". It is needless to say that at the time of upshifting from second to third or from third to fourth speed the output terminals 145 and 146 of the first-to-second gear shift generator circuit 140 are "0" and "1" respectively, while the output terminals 154 and 155 of the second-to-third gear shift generator circuit 150 are respectively "0" and "1" when upshifted from third to fourth speed. The above operation is shown in FIG. 15, where 1 ⇄ 2 represents the shifting point from first to second or from second to first speed, 2 ⇄ 3 the shifting point from second to third or third to second speed, and 3 ⇄ 4 the shifting point from third to fourth or from fourth to third. The ordinate shows the signal states at the individual output terminals, the numerals "1" and "0" indicating the top and bottom of a wave respectively. The gear shift signal generator circuits 140, 150 and 160 are so arranged that the shifting points (lines) as shown in FIG. 13 are formed.

When the vehicle has come to an upward slope, the driver closes the switch 1301 of the ascent-run switching circuit 130 to energize the slope-ascending circuit 133. Then electric current flows from the output terminal 137 of the capacitor 1305 through the input terminal 143 and resistor 1432 to the base of transistor 1431 in the first-to-second gear shift signal generator circuit 140 for a period of time T determined by a time constant due to the capacitor 1305 and the load resistance outside of the output terminal 137 including the resistor 1432, thereby making the transistor 1431 conduct. Consequently, the hysteresis that develops when shifting from second to first speed is eliminated for the period of time T. This is also the case with the second-to-third gear shift signal generator circuit 150 and the third-to-fourth speed change signal generator circuit 160 which do away with the hysteresis for the period of time T when downshifting from third to second and from fourth to third speed respectively.

Furthermore, at the same time that the hysteresis has been eliminated, the signal (voltage) at the output terminal 124 of the throttle circuit 120 becomes $E_3$ indicating the full throttle opening regardless of the throttle state, so that a gear shift occurs at the points of full throttle opening as shown in the gear shift characteristics in FIG. 13. Besides, the voltage $E_4$ from the output terminal 138 of the slope ascending circuit 133 is impressed only on the input terminal 144 of the first-to-second gear shift signal generator circuit 140, thereby causing the voltage $E_4$ to appear at the input terminal 1412 of the comparator circuit 1410 in the first-to-second gear shift signal generator circuit 140. As a result, if $E_4$ is made higher than $E_3$, the shifting points (lines) from first to second speed with the full throttle opening as shown in FIG. 13 will be moved parallel to the right by $\Delta E = E_4 - E_3$. This gear shift characteristic is shown in FIG. 16, in which the abscissa indicates the vehicle speed in Km/h in the state of a full throttle opening. As is apparent from this gear shift characteristic, a higher vehicle speed can be achieved with the first, second, third or fourth speed gear than in the case of the vehicle speed characteristics in FIG. 13. This is especially conspicuous in connection with the first speed gear, by means of which the vehicle speed can be changed automatically even on a steep upward slope. What is more, even when the driver forgets to actuate the ascent-run switching circuit 130 before hand and the vehicle runs on an upward slope in the characteristics in FIG. 13 with the result that the engine load with the particular gear position becomes too heavy to maintain the vehicle speed, it is possible to accelerate the vehicle at the next lower gear position if the vehicle speed then stays in the range of hysteresis in FIG. 16 since said hysteresis can be eliminated for the time interval T by closing the switch 1301 of the ascent-run switching circuit 130. And the rest of the slope is covered with an automatic transmission in the above gear shift characteristic.

The logic circuit 170 is such that when the signals shown in wave-form in FIG. 15 are impressed on the input terminals 171, 172, 173, 174, 175 and 176, the output signals in the form of a wave as shown in FIG. 17 are produced at the four output terminals 171', 172', 173' and 174'.

The memory circuit 180 operates in the same manner as in the first embodiment. The signal states at its input and output terminals are also the same as in said first embodiment.

The electric wiring diagram of the electromagnetic valve drive circuit 190 is the same as in FIG. 10.

What is claimed is:

1. An automatic transmission control system for a vehicle having wheels connected through an automatic transmission having gears to an engine with an accelerator pedal and an electromagnetic valve unit with a plurality of electromagnetic valves having respective solenoids, comprising a wheel r.p.m. detector for generating an output at frequency proportional to the vehicle wheel speed;

an ac to dc voltage converter connected to said detector for converting the output thereof into a corresponding dc voltage;

a throttle switch adapted to cooperate with the accelerator pedal and having a plurality of contacts successively made upon further depression of the accelerator pedal;

a throttle circuit connected to said throttle switch and having an output terminal to provide outputs of various values corresponding to respective contacts of the throttle switch;

a plurality of gear shift signal generators connected to said converter and throttle circuit and having predetermined shifting characteristics and comparing the output signal from said ac to dc converter with the output signal from said throttle circuit;

a logic circuit connected to said gear shift signal generators for producing output signals according to the output signals of said gear shift signal generators;

a memory circuit connected to said logic circuit for holding the signal immediately before the disappearance of the output signals of said logic circuit;

an electromagnetic valve drive circuit connected to and controlled by said memory circuit to feed said solenoids of said electromagnetic valves to change a gear position; and switching means having off and on positions respectively for flat road operation of said vehicle and for upward slope operation thereof, slope-ascending circuit means connected between said switching means and said throttle circuit and operative only when said switching means is in its said on position for applying an electrical signal to said throttle circuit to develop therefrom for said signal generators a said throttle circuit output corresponding to full depression of said accelerator pedal regardless of the actual position of said pedal, said slope-ascending circuit means being further connected to one of said gear shift generators and having means operative only when said switching means is in its said on position for developing and applying a second electrical signal to said one gear shift generator so as to cause in conjunction with said full depression throttle circuit output a change in the said predetermined shifting characteristics for aiding said upward slope operation by said vehicle.

2. An automatic transmission control system for automobiles according to claim 1, wherein said second electrical signal developing means of said slope-ascending circuit means includes a circuit for changing the throttle circuit output to said one shift generator for causing the said predetermined shifting characteristics change to be such that all of the shifting points thereof are moved towards a higher vehicle speed shifting point in response to the switching to said on position of said switching means for said upward slope operation of said vehicle.

3. An automatic transmission control system for automobiles according to claim 1, wherein said shift generators are constructed with a hysteresis characteristic providing a deviation in vehicle speed as to the points for shifting up and shifting down and said slope-ascending circuit includes means connected to said shift generators for developing and applying thereto a third electrical signal for eliminating for a certain time interval the said deviation of vehicle speed and hysteresis characteristic.

* * * * *